United States Patent [19]
Wang

[11] Patent Number: 6,098,332
[45] Date of Patent: Aug. 8, 2000

[54] ELECTRONIC FLOATING MARK STRUCTURE WITH LIGHT INDICATION

[76] Inventor: Chia-Yi Wang, 2nd Fl., No. 6, Lane 41, Chung Cheng Rd., Lin Ko Tsun, Lin Ko Hsiang, Taipei Hsien, Taiwan

[21] Appl. No.: 09/026,424

[22] Filed: Feb. 19, 1998

[51] Int. Cl.⁷ .................................................. A01K 97/12
[52] U.S. Cl. ................................................ 43/16; 43/17
[58] Field of Search ............................................ 43/16, 17

[56] References Cited

U.S. PATENT DOCUMENTS

| | | | |
|---|---|---|---|
| 4,627,186 | 12/1986 | Wang | 43/16 |
| 5,168,651 | 12/1992 | Wilson | 43/17 |
| 5,351,431 | 10/1994 | Ryu | 43/17 |

Primary Examiner—Peter M. Poon
Assistant Examiner—Judith A. Nelson
Attorney, Agent, or Firm—Rosenberg, Klein & Lee

[57] ABSTRACT

An electronic floating mark for fishing having a light indication includes an indication lamp capable of displaying two distinct indications, a control circuit board coupled to the indication lamp for controlling transition of the indication lamp between the two indications, a pair of batteries, a magnetic reed switch capable of being in a conductive state and a non-conductive state, a system of magnetic rings moving with respect to the magnetic reed switch responsive to activity of a fish. The indication lamp is initially in a first indication state (green). When the floating mark has been immersed into water and the magnetic reed switch has been switched into a conducting state, the indication lamp is put into a second indication state (red). In another embodiment, the first indication state requires the floating mark to be immersed in water.

2 Claims, 8 Drawing Sheets

ELECTRONIC FLOATING MARK STRUCTURE WITH LIGHT INDICATION

BACKGROUND OF THE INVENTION

The present invention relates to a floating mark for fishing, and more particularly, to a floating mark with a light indication to inform a person fishing whether a fish is eating the bait.

SUMMARY OF THE INVENTION

It is an object of the present invention to provide a floating mark for fishing capable of indicating whether the floating mark is static in water or is dynamic since the bait is eaten by a fish, so that during the fishing, the fisher may determine whether the fish is eating the bait from the indication by means of an indication lamp, both in day-time and night.

It is a further object of the present invention to provide a floating mark for fishing having two status indications, including a first stage light source indication (green) and a second (red) stage light source indication, and a power saving (wait) status therebetween. The first light source (green) indication is formed by connecting the indication lamp, control circuit board and a battery in a closed electrical circuit.

Before the second stage light source (red) indication, in order to save power, another conducting status will be used. By the connection of the magnetic strips on the two ends of the magnetic reed switch and the two water contacts immersed into the water, a wait condition before the second stage light source (red) is attained.

By connecting a magnetic reed switch to the control circuit board and by installing three magnetic rings on the periphery of the magnetic reed switch, and further by pulling of the fishing rod as the fish eats the bait, the second magnetic ring will be also pulled to the position corresponding to location of the magnetic reed switch. Then the magnetic ring will "close" the magnetic reed switch to form a conducting condition, so that the second light source (red) is attained.

Further, in the present invention, the outside of the magnetic reed switch is provided with three magnetic rings which are displaced each from the other due to repelling forces caused by the same polarity of the magnetic rings, that may be used to replace a spring of conventional systems. Thus the elastic fatigue and the mechanic malfunction from sinking in water may be prevented. Therefore the present invention may be used continuously for a long time, that is a further object of the present invention.

BRIEF DESCRIPTION OF THE DRAWINGS

The present invention will be better understood and its numerous objects and advantages will become apparent to those skilled in the art by referring to the following drawings in which.

DESCRIPTION OF THE PREFERRED EMBODIMENT

Figure 1:
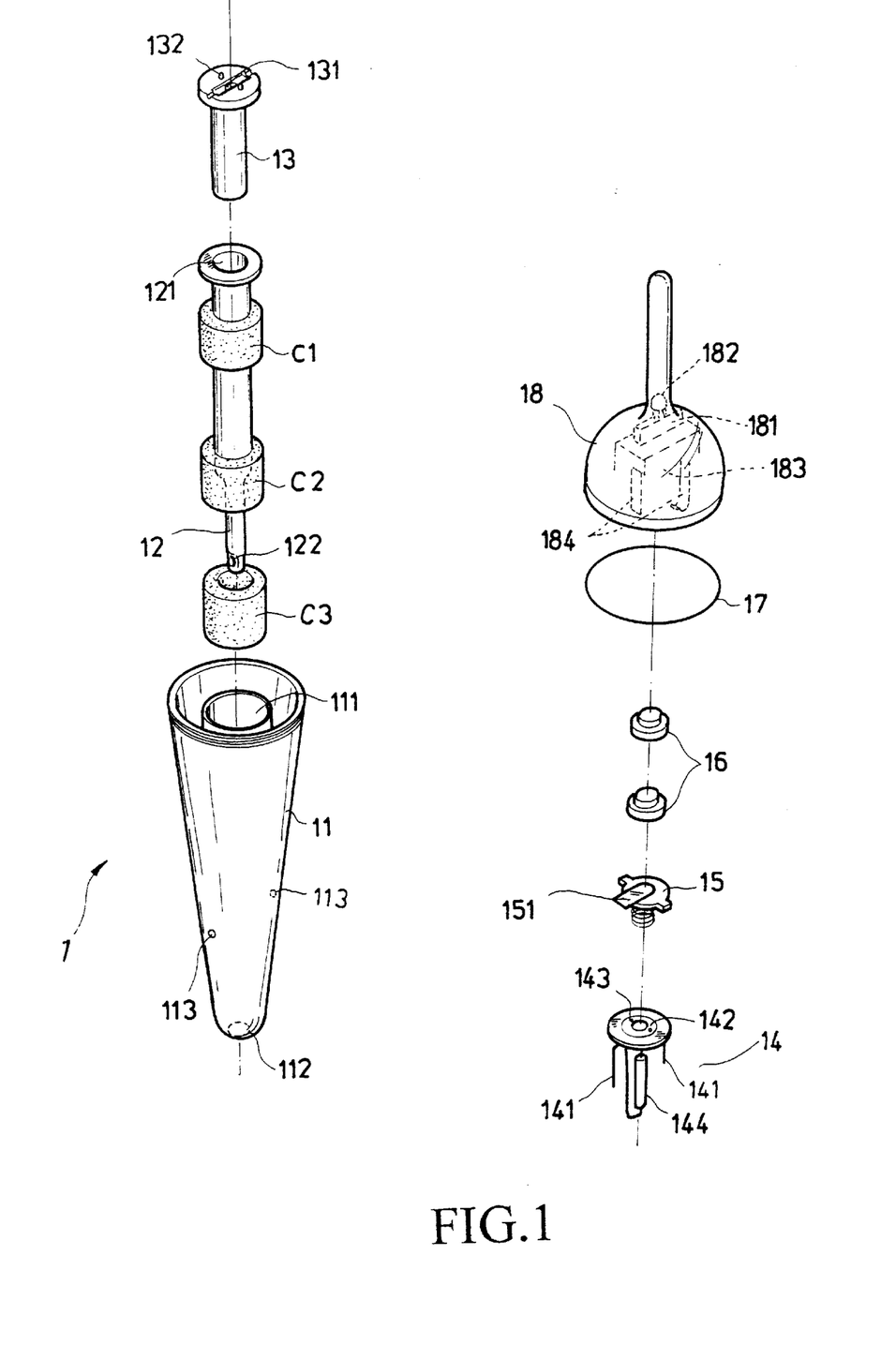
FIG. 1 is a perspective exploded view of the floating mark of the present invention.
Figure 2:
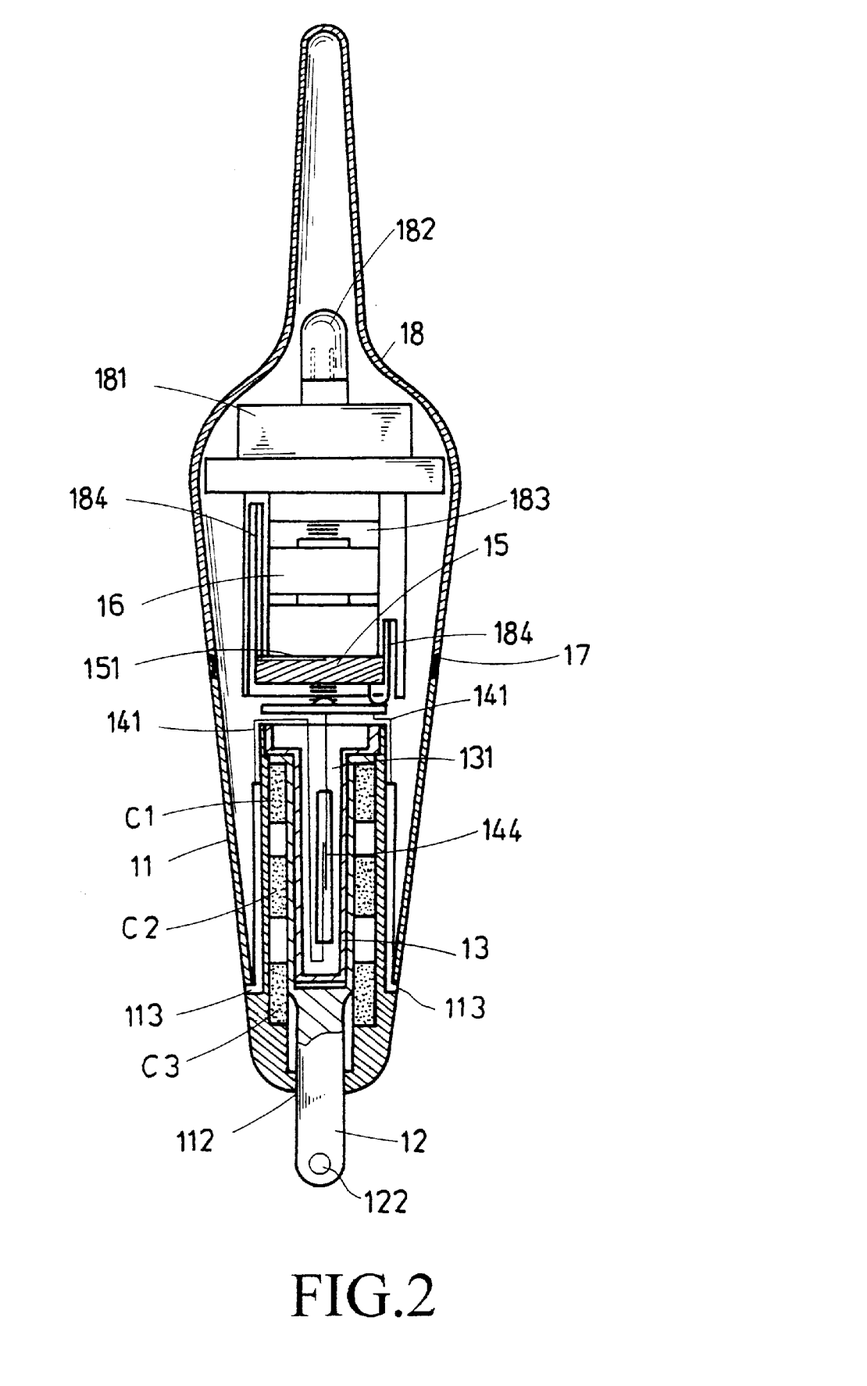
FIG. 2 is a longitudinal sectional view of the assembled floating mark of the present invention.

The present invention is related to an electronic floating mark structure with light indication. Referring to FIGS. 1 and 2, a floating mark structure (1) comprises a lower cover (11), a fishing rod (12), a receiving tube (13), a magnetic reed switch set (14), magnetic rings (C1), (C2), (C3), a battery cover (15), and an upper cover (18).

A receiving tank (111) having a receiving space is formed in the lower cover (11) for receiving fishing rod (12) and magnetic rings (C1), (C2), (C3). The bottom thereof is provided with a penetrating receiving hole (112). Two water contacts (113) are installed on the periphery of the receiving tank (111). The two water contacts (113) are directed downwards and pass to the outside of the lower cover (11) to serve as conducting lines.

Figure 4:
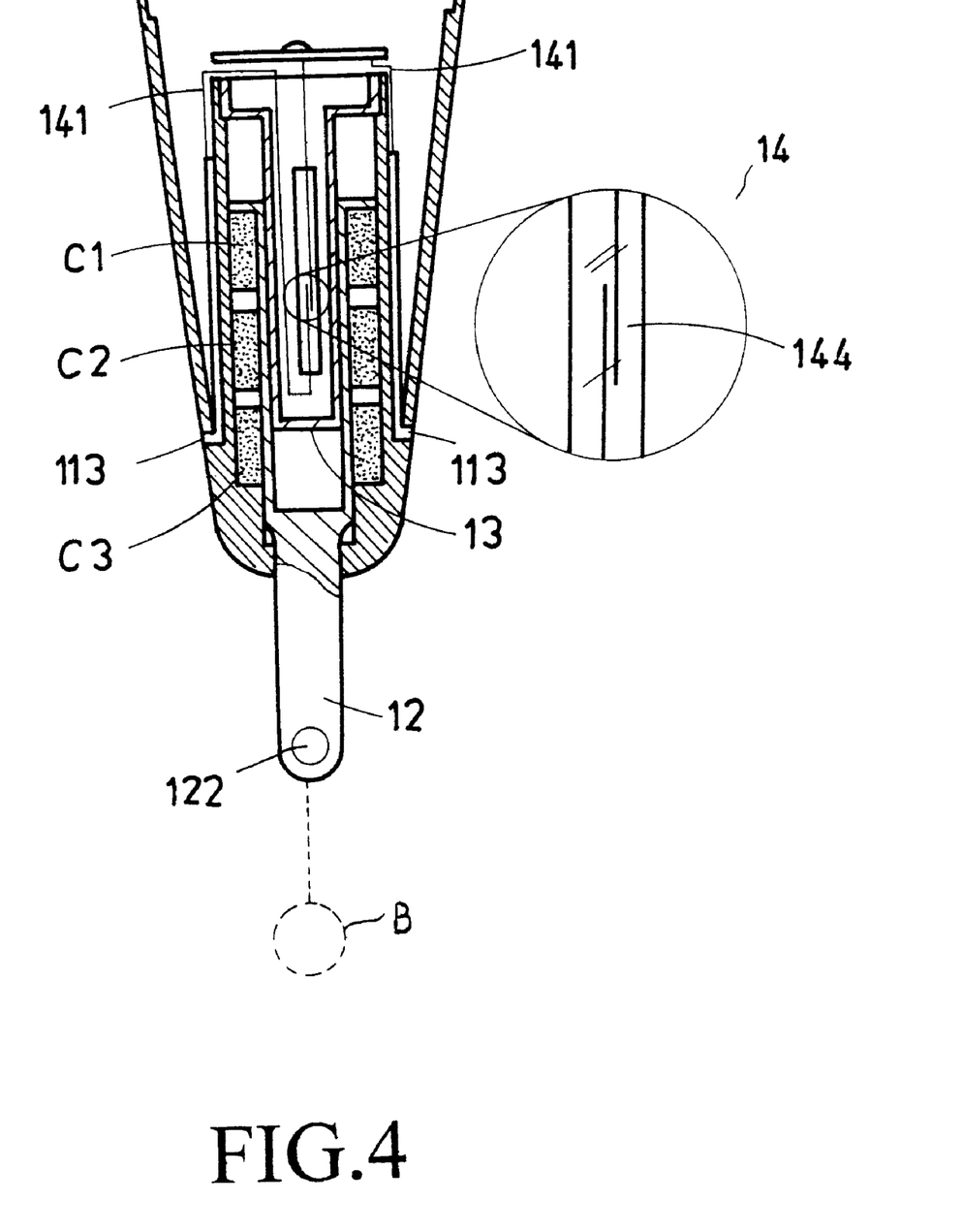
FIG. 4 is a partial longitudinal sectional view of the floating mark of the present invention.

A rod head (122) is positioned on the bottom of the fishing rod (12) and an engaging hole (121) is disposed between the fishing line and a lead block (B), best shown in FIG. 4.

Three magnetic rings (C1), (C2), and (C3) having the same polarity and therefore repelling each other are put on said fishing rod (12) and are received within said receiving tank (111).

The receiving tube (13) is received within said engaging hole (121). A bearing hole (131) is formed in the center of the receiving tube (13) for disposing said magnetic reed switch (144). The upper end of the receiving tube (13) is provided with two convex embedded points (132).

The top of the magnetic reed switch set (14) is formed as a round disk and is connected with a magnetic reed switch (144) at the center thereof. An extending strip (141) is coupled to the magnetic reed switch (144). The center of the round disk has a ring insulated portion (142), the outer rim of which is a copper piece and is connected with another extending strip (141), while the center thereof is a non-insulated portion. Embedded holes are installed on the insulated portion (142) in alignment with said embedded points (132) on the receiving tube (13).

The upper cover (18) and the lower cover (11) are combined together, with a drain preventing pad (17) disposed therebetween. A control circuit board (181) is installed within said upper cover (18) and an indication lamp (182) with two stage control light source is installed on the control circuit board (181). The receiving space on the bottom of the control circuit board (181) is a battery receiving space (183) for receiving batteries (16), while connecting pieces (184) for connecting with the control circuit board (181) are installed on the two sides of the battery receiving space (183), wherein one of the connecting pieces (184) has a hook shape. Once assembled, the hook of the connecting piece (184) contacts the copper piece on the outer rim of the round disk of said magnetic reed switch set (14).

The bottom of the battery cover (15) is provided with a spring and the top portion thereof is provided with a conducting piece (151), which is installed in said battery receiving space (183).

In assembling, referring to FIG. 2, the control circuit board (181) and the indication lamp (182) are coupled and preset, so that the display status of the indication lamp (182)

is controlled by said control circuit board (181). Two batteries are received within said battery receiving space (183). The conducting piece (151) of the battery cover (15) is connected with a connecting piece (184), thus allowing conditions indicated by the first stage light source (green light), i.e., a normal conducting status. In the lower cover (11), the third magnetic ring (C3) is first fixedly disposed on the lowermost end of the receiving tank (111), and then the second and first magnetic ring (C2) and (C1) are received in sequence therein. These three magnetic rings (C1), (C2), and (C3) are of the same polarity and repel each other. Next, the fishing rod (12) is covered within said receiving tank (111), while the rod head (122) of the fishing rod (12) is projected to the outside through the receiving hole (112), thus the whole fishing rod (12) may be moved upwards and downwards within the receiving tank (111). The magnetic reed switch set (14) is received within the receiving tube (13), and the receiving tube (13) is further disposed in the engaging hole (121). After the lower cover (11) has been assembled, the magnetic reed switch set (14) and the spring of the battery cover (15) of the upper cover (18) are brought into contact, thus the assemble of the upper cover and the lower cover is completed.

Figure 3:
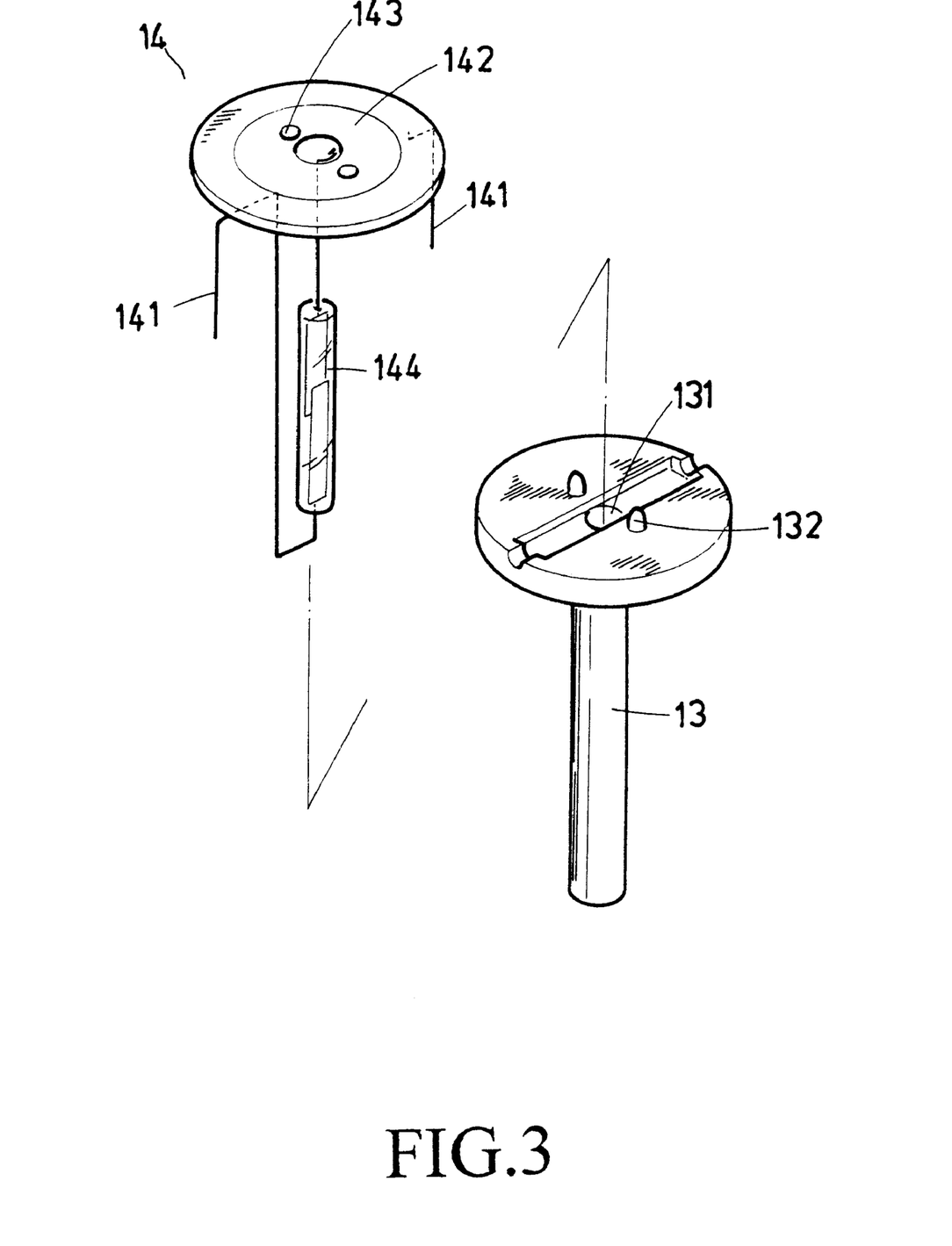
FIG. 3 is an enlarged perspective view of the magnetic reed switch and the receiving tube of the present invention.

Referring to FIG. 3, the magnetic reed switch set (14) is received within the receiving tube (13), with the magnetic reed switch (144) located within the bearing hole (131). In order to fix said magnetic reed switch set (14), the embedded holes (143) and the embedded points (132) are fixedly coupled each with the other. The extending strips (141) on the two sides of the magnetic reed switch (144) are connected to the water contacts (113).

Figure 5:
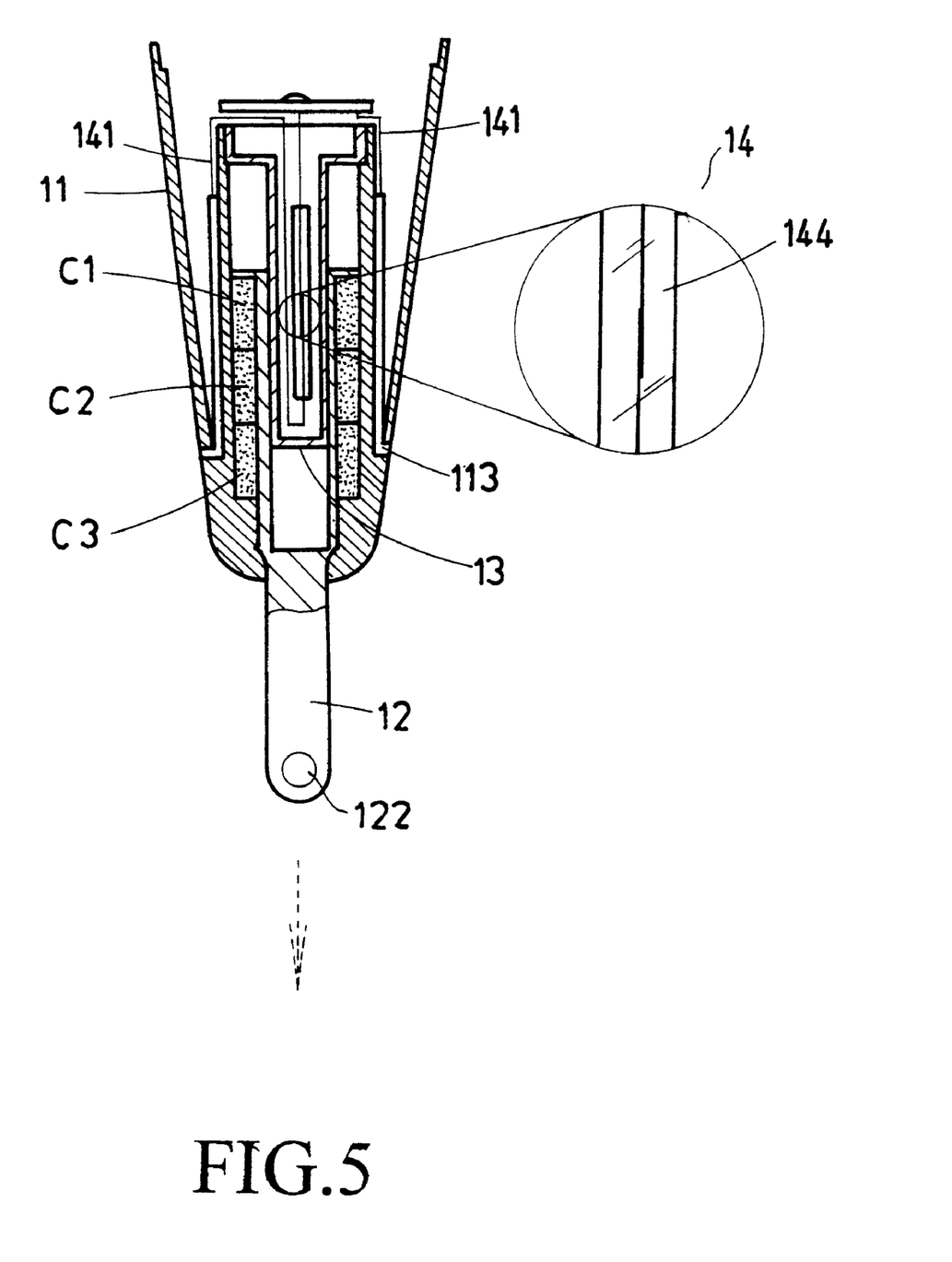
FIG. 5 shows the second stage light source status wherein the floating mark is pulled downwards since the fish eats a bait.
Figure 6:
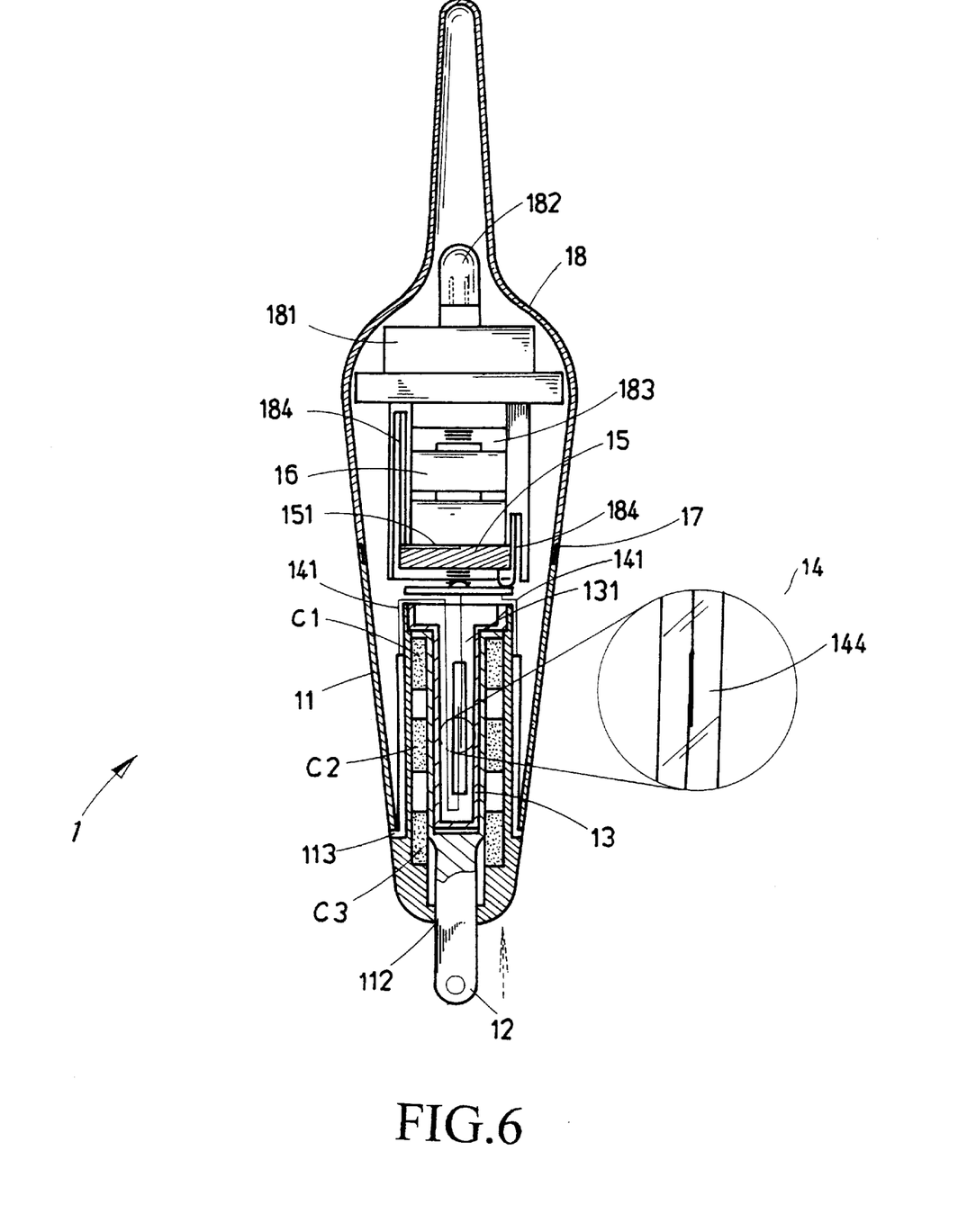
FIG. 6 shows the second stage light source wherein the fishing rod is pulled backwards by a fish.

Referring to FIG. 2, and further to FIGS. 4, 5, and 6, after the floating mark (1) has been assembled but has not yet been put into the water, then the first stage light source (green) indication appears wherein the first, second and third magnetic rings (C1), (C2), and (C3) are spaced apart, as shown in FIG. 2, with the second magnetic ring (C2) surrounding the magnetic reed switch (14). The magnetic reed switch (144) is attracted by the magnetic force of the second magnetic ring so as to form a conducting condition, but the two water contacts (113) of the circuit are not in conducting state. Thus, the second stage light source (red) is still not attained. When the fisher uses the floating mark (1), the lower end of the fishing rod (12) must be loaded with the lead block (B) and a bait, and as soon as the floating mark (1) is put in the water, the floating mark (1) orients itself vertically in the water, thus the fishing rod (12) will move downwardly by the pulling force of the lead block B, as shown in FIG. 4. The weight of the lead block B is chosen to match and overcome the repelling magnetic forces of the magnetic rings, therefore, as the fishing rod (12) is moved downwards, it will in turn push the first magnetic ring (C1) to move downwardly. Since the first magnetic ring (C1) and the second magnetic ring (C2) are mutually repelled, then the displacement of the magnetic ring (C1) will also push the second magnetic ring (C2) to move downwardly to leave the level of the magnetic reed switch (144). Therefore, the magnetic reed switch (144) will not be in the conducting state. But since the floating mark (1) is floating on the water, then the water contacts (113) will connect the positive and negative polarities through the water. The indication lamp (182) is connected by the connecting piece (184) to the conducting piece (151) of the battery cover (15). The light source indication will present the indication of the first (green) stage indication lamp (182), while the second stage light source is not indicated. That is when the floating mark is static, the indication lamp (182) presents the normal first stage light source (green) indication.

When the fish is eating the bait, the floating mark (1) of the fishing rod (12) will be pulled downwards (as shown in FIG. 5), then in turn the first and second magnetic rings (C1) and (C2) will be pressed down, so that the first magnetic ring (C1) is positioned around the magnetic reed switch (144). By the magnetic characterization thereof, the magnetic reed switch (144) will conduct. The switch (144) is connected to the battery cover (15) at its upper portion, and the two water contacts (113) are located in water and conduct through water, therefore, the indication lamp (182) may present the second stage light source (red) display, thereby indicating that the fish is eating the bait, thus the fisher may pull the fishing rod immediately.

When a fish eats the bait toward the upper end of the floating mark (1), and pushes the floating mark backwards, as shown in FIG. 6, then the fishing rod (12) will immediately lose the weight of the lead block B, and the magnetic ring will not be pulled down. The third magnetic ring (C3) on the bottom of the fishing rod (12) will push the second magnetic ring (C2) away toward the level of the magnetic reed switch (144), therefore, the magnetic reed switch (144) will be also in conducting status, so that the indication lamp (182) presents the second stage light source (red) indication to indicate that the fish is eating the bait in this very instant. Thus the design of the present invention has considered the different direction in which the fish eats the bait.

By the coupling of the control circuit board (181), indication lamp (182) and magnetic reed switch (144), the present invention may generate two stage light source indication, i.e., the normal first stage light source (green) indication and the second stage light source (red) indication in which the control status is defined by the two water contacts (113) and the magnetic reed switch set (14). Alternatively, the magnetic reed switch (144) is "closed" by the magnetic forces of the magnetic rings (C1) and (C2), or is "opened" and pushed away thereby, thus the sensitivity of pulling or rewinding fishing rod (12) is promoted. The installation of the magnetic rings (C1), (C2) and (C3) in the present invention is more flexible than the spring used in the prior art.

Figure 7:
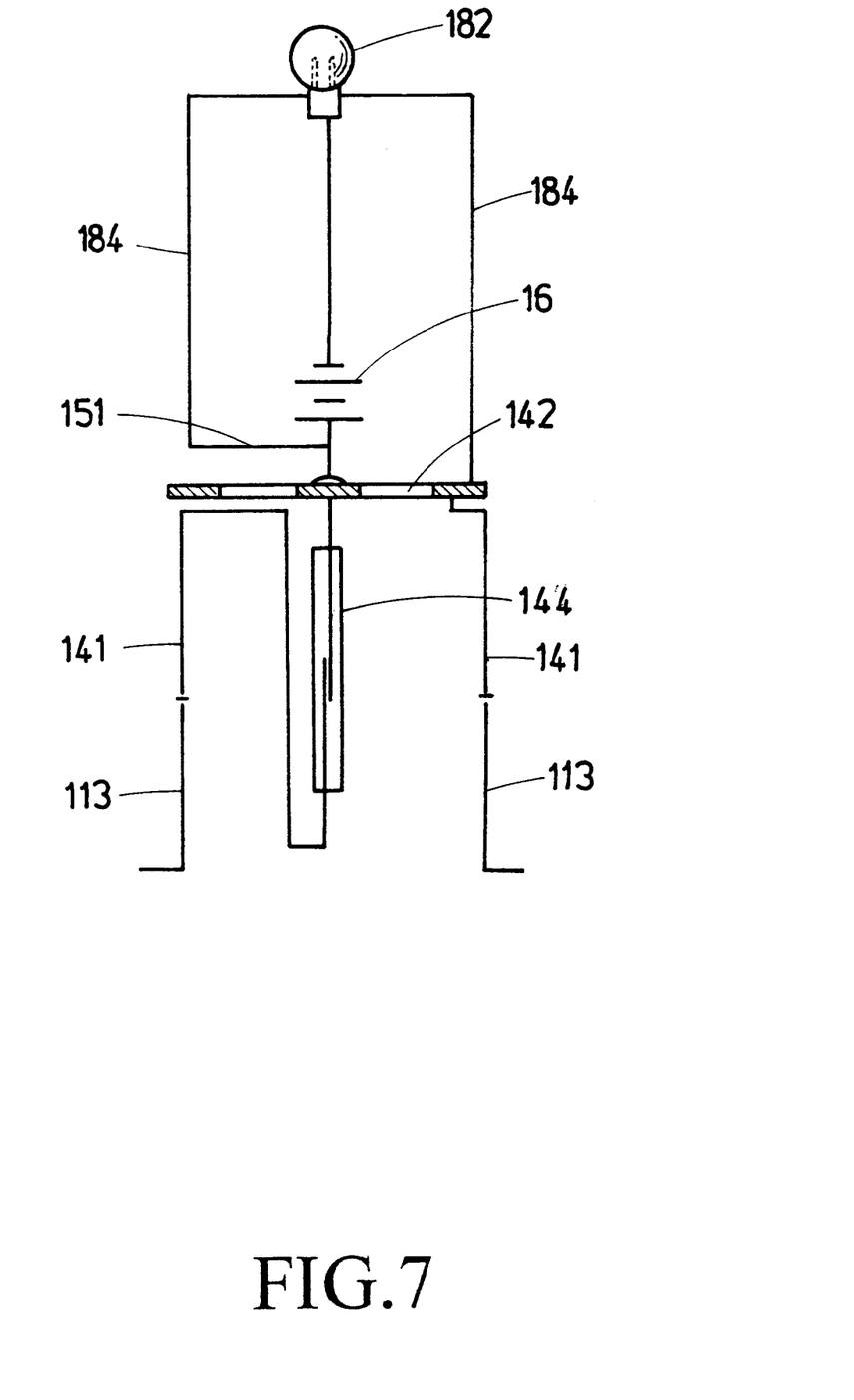
FIG. 7 is a circuit diagram of the present invention.

The conduction of the magnetic reed switch (144) is controlled by the repulsion of the magnetic rings (C1), (C2), and (C3) of the same polarity. Referring now to FIGS. 3 and 7, after assembling the floating mark of the present invention, if it has not been put in water, the indication lamp is in a normal first stage light source (green) display, while as shown in FIG. 4, the magnetic reed switch (114) is not conducting and the two water contacts (113) have not been immersed in the water so that the magnetic reed switch (144), the battery cover (15) and the connecting piece (184) are not in conducting status. Thus the light source (red) of the indication lamp (182) has not been displayed. When the floating mark (1) of the present invention has been put in water, the two water contacts (113) will conduct through the medium of water, and if the fishing rod (12) is pulled to move because of the bait is eaten by a fish, then the magnetic rings (C1) and (C2) will control the magnetic reed switch (144) to close it so that to form a conducting loop, and thereby will let the second light source (red) display to inform the fisher that the fish is eating now. This design may be used to prevent the malfunctions or power loss due to the floating mark having not been put in water.

Figure 8:
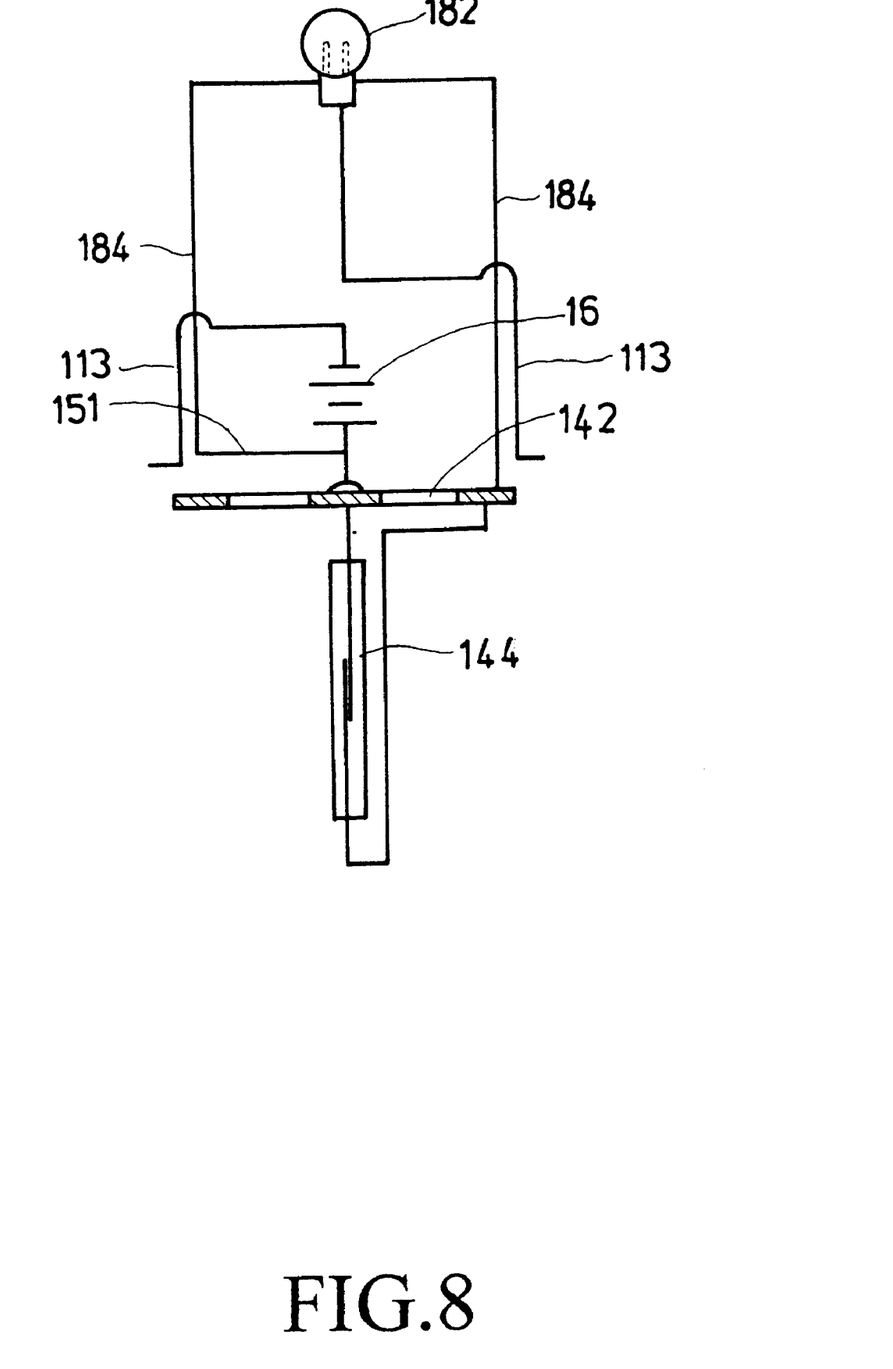
FIG. 8 is a circuit diagram of another embodiment of the present invention.

That is to say in the normal first stage light source, if the second stage light source is to occur, it must require that the magnetic reed switch (144) is conducting and the water contacts (113) are immersed in the water. If it is required to further save the power, as shown in the embodiment of FIG.

8, the two water contacts (113) and the firs stage light source (green) display are connected in serial, so that for the display of the first stage light source (green), the two water contacts (113) must be immersed in the water to conduct. Thus, if the present invention has not been put in water, it still has the effect of saving power. Of course, said two embodiments of the circuit of the present invention are both within the range of the present invention.

In summary, in the design of the floating mark of the present invention, the three magnetic rings and the magnetic reed switch are coupled together to improve the sensitivity of pulling the fishing rod and prolong the lifetimes of the components within the floating mark. A two stage light source indication through the magnetic reed switch and the water contacts will inform the fisher to wait or pull the fishing rod. Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. An electronic floating mark structure with light indication, comprising:

an indication lamp capable of displaying a first stage light source indication and a second stage light source indication distinct from said first stage light source indication;

a control circuit board coupled to said indication lamp and controlling transitions of said indication lamp between said first and second stage light source indications;

at least one battery;

a magnetic reed switch having first and second terminals, and coupled by said first terminal thereof to said at least one battery, said magnetic reed switch having a conductive state and a non-conductive state;

means for controlling translation of said magnetic reed switch between said conductive and non-conductive states, said controlling means closing said magnetic reed switch to define said conductive state responsive to a fish eating bait coupled to said floating mark structure;

a first electrical circuit coupled to said indication lamp, said control circuit board, and said at least one battery for providing a connection therebetween to form a closed electrical circuit and to maintain said indication lamp in said first stage light source indication; and a second electrical circuit coupled to said magnetic reed switch and said at least one battery for providing a connection therebetween to form a closed electrical circuit responsive to said floating mark structure being immersed in water and said magnetic reed switch being in said conductive state to enable said second stage light source indication.

2. The electronic floating mark structure of claim 1, further comprising:

a lower cover having a receiving tank extending longitudinally therewithin, and a penetrating receiving hole formed at a bottom of said lower cover;

an upper cover coupled to said lower cover, said upper cover receiving said control circuit board and having a battery receiving space formed therein;

said indication lamp being installed within said upper cover in contact with said control circuit board, first and second connecting pieces being connected to said control circuit board and being installed within said battery receiving space;

said at least one battery being installed within said battery receiving space in said upper cover;

a drain preventing pad disposed between said lower and upper covers;

a fishing rod member having an engaging hole at one end thereof and further having a rod head at an opposing end thereof;

said controlling means including three magnetic rings of the same polarity installed on said fishing rod member in longitudinally spaced relationship, said fishing rod member with said magnetic rings being received within said receiving tank of said lower cover with said rod head of said fishing rod member protruding through said penetrating receiving hole in said lower cover;

a receiving tube having upper and lower ends and further having a bearing hole extending longitudinally within said receiving tube between said upper and lower ends thereof for receiving said magnetic reed switch therein, said upper end of said receiving tube having projected embedded points being provided thereon, said receiving tube being installed within said engaging hole of said fishing rod member;

a battery cover having a conducting piece disposed in contact with said at least one battery;

a circular disk having a conducting center, a ring-shaped insulated portion surrounding said conducting center, and an outer conducting rim surrounding said ring-shaped insulated portion, said magnetic reed switch being connected to said conducting center of said circular disk on one end thereof;

a first extending strip extending from another end of said magnetic reed switch; and, a second extending strip extending from said conducting rim.

* * * * *